(12) United States Patent
Wu et al.

(10) Patent No.: US 8,477,372 B2
(45) Date of Patent: Jul. 2, 2013

(54) UPDATING AN IMAGE QUALITY METRIC DATABASE TO ACCOUNT FOR PRINTER DRIFT

(75) Inventors: Wencheng Wu, Webster, NY (US); Edul N. Dalal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 670 days.

(21) Appl. No.: 12/781,988

(22) Filed: May 18, 2010

(65) Prior Publication Data

US 2011/0286014 A1 Nov. 24, 2011

(51) Int. Cl.
*H04N 1/60* (2006.01)

(52) U.S. Cl.
USPC ......... 358/1.9; 358/1.14; 358/1.16; 358/3.24; 358/3.26; 358/504; 358/518; 358/519; 358/520; 358/521

(58) Field of Classification Search
USPC ............. 358/1.9, 3.26–3.27, 504, 518–527
See application file for complete search history.

(56) References Cited

U.S. PATENT DOCUMENTS

| | | | |
|---|---|---|---|
| 5,523,831 A * | 6/1996 | Rushing | 399/31 |
| 5,777,656 A * | 7/1998 | Henderson | 347/251 |
| 6,366,306 B1 * | 4/2002 | Fukuda | 347/172 |
| 6,483,996 B2 * | 11/2002 | Phillips | 399/38 |
| 6,963,424 B1 * | 11/2005 | Higuchi | 358/1.9 |
| 7,239,422 B2 | 7/2007 | Braun et al. | |
| 7,239,820 B2 * | 7/2007 | Donaldson | 399/49 |
| 7,245,395 B2 | 7/2007 | Couwenhoven et al. | |
| 7,365,879 B2 | 4/2008 | Braun et al. | |
| 7,376,269 B2 | 5/2008 | Klassen et al. | |
| 7,379,682 B2 * | 5/2008 | Campbell et al. | 399/49 |
| 7,382,507 B2 | 6/2008 | Wu | |
| 7,383,261 B2 * | 6/2008 | Mestha et al. | 1/1 |
| 7,486,416 B2 | 2/2009 | Dalal et al. | |
| 7,495,804 B2 | 2/2009 | Rozzi | |
| 7,796,151 B2 * | 9/2010 | Pepe | 347/236 |
| 8,305,635 B2 * | 11/2012 | Nakamura | 358/1.9 |
| 2002/0021321 A1 * | 2/2002 | Nakajima et al. | 347/19 |
| 2004/0165024 A1 * | 8/2004 | Vilanova et al. | 347/19 |
| 2005/0105112 A1 * | 5/2005 | Fukuda | 358/1.9 |
| 2005/0160092 A1 | 7/2005 | Mestha et al. | |
| 2006/0103899 A1 | 5/2006 | Wu | |
| 2006/0110009 A1 | 5/2006 | Klassen et al. | |
| 2006/0215240 A1 | 9/2006 | Mongeon | |

(Continued)

OTHER PUBLICATIONS

Briggs, Applications of ISO-13660 A New International Standard for Objective Print Quality Evaluation, Imaging Society of Japan, Jul. 21-23, 1999, Tokyo: Japan.

(Continued)

*Primary Examiner* — Richard Zhu
(74) *Attorney, Agent, or Firm* — Philip E. Blair; Fleit Gibbons Gutman Bongini & Bianco P.L.

(57) ABSTRACT

What is disclosed is a novel system and method for determining a printer metric in terms of image quality (IQ) over a large complex set of conditions based upon measurements taken over a small simple set of conditions while compensating for printer drift. The present system and method effectively utilizes a predictive model that predicts noise measurements of multi-separations from those of single-separation colors and/or a subset of the multi-separations. Because a model is used to comprehend the metric over the entire gamut, the number of patches is reduced. This reduction enables the method to be used within a machine to dynamically characterize the device's image quality metric. Various embodiments have been disclosed.

24 Claims, 10 Drawing Sheets

| | TIME T1 | | | TIME T2 | |
|---|---|---|---|---|---|
| MEASURED IQ METRIC (SET AT T1) | IQ MODEL (1ST INSTANCE AT T1 & DERIVED FROM A SUBSET) | ERROR (SET AT T1) | IQ MODEL (2ND INSTANCE AT T2 & DERIVED FROM A SUBSET) | CORRECTED (ERROR + MODEL-PREDICTED VALUE- 2ND INSTANCE) (SUBSET AT T2) | |
| MEASURED VALUE 1 | MODEL-PREDICTED VALUE 1 | ERROR VALUE 1 | MODEL-PREDICTED VALUE 1 | CORRECTED 1 = ERROR VALUE 1 + MODEL-PREDICTED VALUE 1 | |
| MEASURED VALUE 2 | MODEL-PREDICTED VALUE 2 | ERROR VALUE 2 | MODEL-PREDICTED VALUE 2 | CORRECTED 2 = ERROR VALUE 2 + MODEL-PREDICTED VALUE 2 | |
| MEASURED VALUE 3 | MODEL-PREDICTED VALUE 3 | ERROR VALUE 3 | MODEL-PREDICTED VALUE 3 | CORRECTED 3 = ERROR VALUE 3 + MODEL-PREDICTED VALUE 3 | |
| ... | ... | ... | ... | ... | |
| MEASURED VALUE n | MODEL-PREDICTED VALUE n | ERROR VALUE n | MODEL-PREDICTED VALUE n | CORRECTED N = ERROR VALUE n + MODEL-PREDICTED VALUE n | |

U.S. PATENT DOCUMENTS

2006/0244980 A1 11/2006 Grace
2006/0274337 A1* 12/2006 Dalal et al. .................... 358/1.9
2008/0137914 A1 6/2008 Minhas

OTHER PUBLICATIONS

Daniel S. Hann, Specular Image Capture and Evaluation for Microgloss Uniformity Measurements, May 22, 2003.

International Color Consortium, Image Technology Colour Management—Architecture Profile Format and Data Structure, Specification ICC 1:2004-10 (Profile Version 4.2.0.0) Revision of ICC 1:2003-09, May 22, 2006.

Rasmussen, ISO 19751 Macro Uniformity.

U.S. Appl. No. 12/352,841, Job-Specific Print Defect Management, Filed Jan. 19, 2009.

U.S. Appl. No. 12/727,724, On-Paper Image Quality Metric Using On-Belt Sensing, filed Mar. 19, 2010.

U.S. Appl. No. 12/727,760, Color Mapping Determination for an N-Color Marking Device Based Upon Color Stability, filed Mar. 19, 2010.

U.S. Appl. No. 12/727,791, Color Mapping Determination for an N-Color Marking Device Based Upon Image Spatial Noise Defects, filed Mar. 19, 2010.

U.S. Appl. No. 12/727,692, Image Quality Performance for a Color Marking Device, filed Mar. 19, 2010.

* cited by examiner

| MEASURED IQ METRIC (SET AT T1) | TIME T1 — IQ MODEL (1ST INSTANCE AT T1 & DERIVED FROM A SUBSET) | ERROR (SET AT T1) | TIME T2 — IQ MODEL (2ND INSTANCE AT T2 & DERIVED FROM A SUBSET) | TIME T2 — CORRECTED (ERROR + MODEL-PREDICTED VALUE-2ND INSTANCE) (SUBSET AT T2) |
|---|---|---|---|---|
| MEASURED VALUE 1 | MODEL-PREDICTED VALUE 1 | ERROR VALUE 1 | MODEL-PREDICTED VALUE 1 | CORRECTED 1 = ERROR VALUE 1 + MODEL-PREDICTED VALUE 1 |
| MEASURED VALUE 2 | MODEL-PREDICTED VALUE 2 | ERROR VALUE 2 | MODEL-PREDICTED VALUE 2 | CORRECTED 2 = ERROR VALUE 2 + MODEL-PREDICTED VALUE 2 |
| MEASURED VALUE 3 | MODEL-PREDICTED VALUE 3 | ERROR VALUE 3 | MODEL-PREDICTED VALUE 3 | CORRECTED 3 = ERROR VALUE 3 + MODEL-PREDICTED VALUE 3 |
| ... | ... | ... | ... | ... |
| MEASURED VALUE n | MODEL-PREDICTED VALUE n | ERROR VALUE n | MODEL-PREDICTED VALUE n | CORRECTED N = ERROR VALUE n + MODEL-PREDICTED VALUE n |

FIG. 1

UPDATING AN IMAGE QUALITY METRIC DATABASE TO ACCOUNT FOR PRINTER DRIFT

TECHNICAL FIELD

The present invention is directed to systems and methods for determining image quality metric of a color marking system.

BACKGROUND

With the advent of in-line sensing technologies, it has become more and more common that color marking systems are able to gather information about image quality (IQ) defects and utilize that information, for example, to improve their image quality metric. The success of these technologies relies heavily on the timely availability of the information of image quality defects. A full characterization of the entire color space for a given image quality metric, such as mottle, graininess, banding, and temporal color variations requires a large number of printed patches. For many applications, it can be prohibitive to print and measure all colors of interest to build a comprehensive image quality metric database over a target device's entire color gamut.

Moreover, image marking devices change over time due to operating conditions including wear and tear. This change in the characteristics of an image marking device over time is often referred to as "drift". If entries in the image quality database remain static, these will not properly track the drift of the image marking device. Often times, the image quality database must be updated by subsequently printing and measuring of large numbers of color patches. This repeated operation is time consuming in effort, paper, and other resources.

Accordingly, what is needed in this art are increasingly sophisticated systems and methods for determining image quality metric for any color of interest based upon measurements obtained for a small number of colors and accommodate the drift of the image marking device.

BRIEF SUMMARY

What is disclosed is a novel system and method for determining printer performance in terms of image quality (IQ) metrics over a large complex set of conditions based upon measurements taken over a small simple set of conditions. The present invention improves the estimation of the image quality by taking into account a temporal aspect of drift in the image marking device. In one embodiment, the present system and method utilizes a combination of print noise measurements of printed separation colors, the nominal printer model, for example, readily available from the color profiles, and statistical modeling techniques such as Monte Carlo simulation or a variance model, to predict noise of multi-separation colors from the single-separation colors. In another embodiment, a combination of print noise measurements of printed colors and look up tables (LUT) or polynomial fitting options, are used to predict noise of multi-separation colors from the single-separation colors or multiple-separation colors. An IQ Metric database is updated with error values representing the difference between measured values over the gamut and model predicted values to account for drift in the image marking device. Because a model is used to comprehend image quality over the entire gamut, the number of patches is reduced. In such a manner, a given device's IQ metric can be dynamically characterized within the customer's print/copy job environment. Advantageously, the present method is applicable to a wide variety of image quality defects caused by printer noises such as, for example, 2-D random (non-structured) spatial noise defects, such as mottle, graininess and moiré, 1D spatial defects, such as streaks, and banding.

In one example embodiment, the present system and method for determining image quality variation of a color marking device involves performing the following at two distinct times T1 and T2. At a first time T1 a defined image quality (IQ) metric for the set of device-dependent colorant specifications is measured and then stored in an IQ metric database. A first model is derived based upon the measurements obtained for the defined IQ metric, corresponding to a subset of the device-dependent colorant specifications. This model is used to obtain model-predicted values for the defined IQ metric at the set of device-dependent colorant specifications. An error term is determined at each of the set of device-dependent colorant specifications for the defined image quality metric, the error term being a difference between the measured image quality metric and the model-predicted values. These error terms are added to the model-predicted values to produce modified model-predicted values at each of the set of device-dependent colorant specifications. The IQ metric database is updated with these modified model-predicted values. Subsequently at a second time T2, the defined image quality metric for the subset of device-dependent colorant specifications is measured. A second model is derived based upon these measurements performed at the second time T2. Again, model-predicted values are obtained using the model for the defined image quality metric at the set of device-dependent colorant specifications. The set of error terms are added to the model-predicted values at each of the set of device-dependent colorant specifications to update the IQ metric database.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which:

FIG. 1 is a list of entries in a file, such as a database, illustrating various 2-D image quality metrics stored over time;

DETAILED DESCRIPTION

Figure 2:
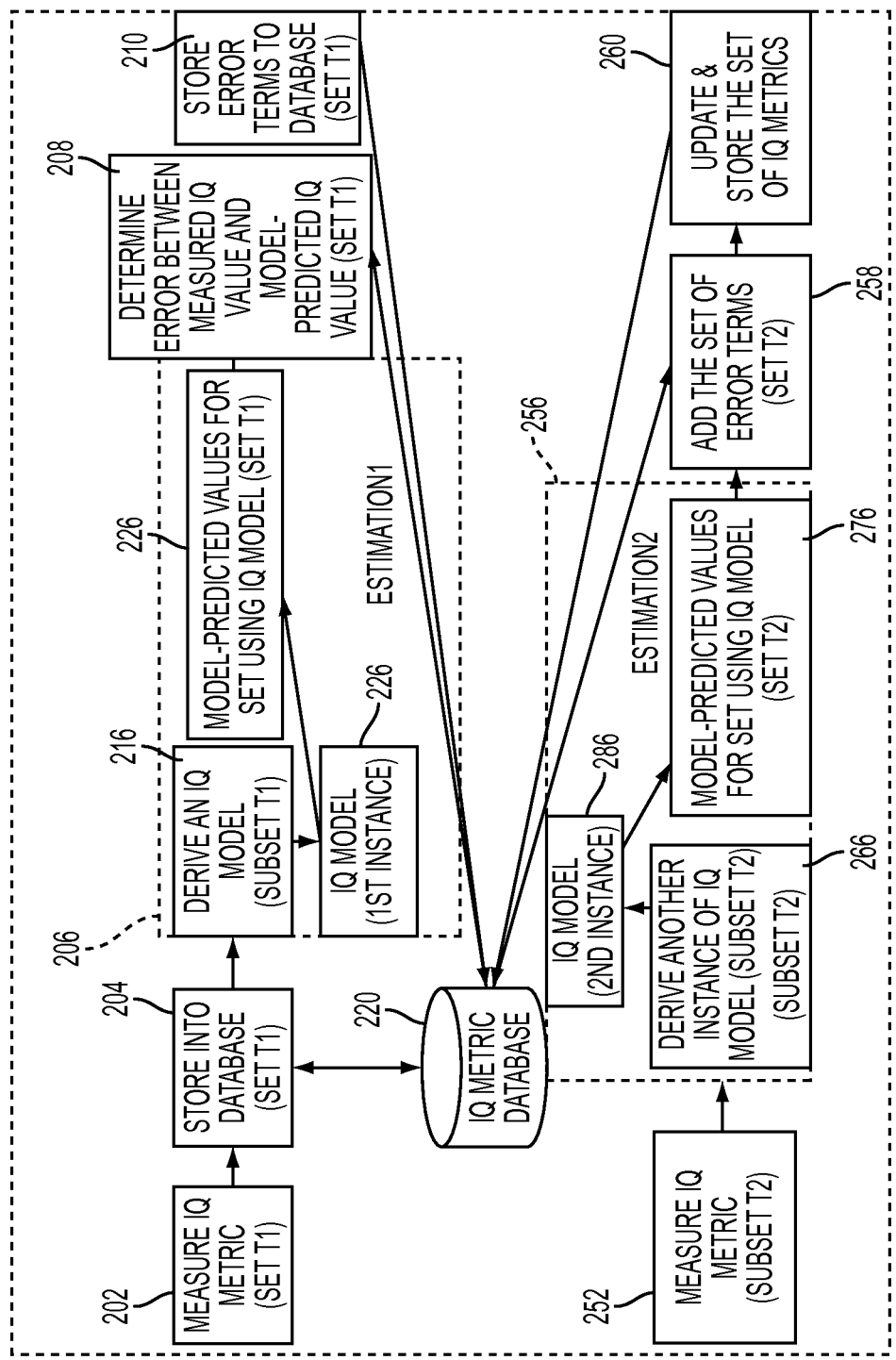
FIG. 2 is a functional block diagram illustrating one example embodiment of updating an 2-D image quality metric database.

What is disclosed is a novel system and method for determining printer performance in terms of image quality (IQ) metrics over a large complex set of conditions based upon measurements taken over a small simple set of conditions while compensating for printer drift. Image marking devices, change or "drift" over time due to operating conditions and wear and tear. The present invention improves the estimation of the image quality by taking into account a temporal aspect of image marking device drift.

It should be understood that one of ordinary skill in this art would be readily familiar with many facets of color science such as, but not limited to, color space, color gamuts, gamut mapping, device calibration, and other related techniques and algorithms commonly found in the digital document reproduction arts. Additionally, one of ordinary skill would also be familiar with techniques used for color manipulation and various color transformation processes and the systems involved with color imaging. Those of ordinary skill would be familiar with the text: "*Digital Color Imaging Handbook*", CRC Press (2003), ISBN-13: 9780849309007, and "*Control of Color Imaging Systems: Analysis and Design*", CRC Press (2009), ISBN-13: 9780849337468, both of which are incorporated herein in their entirety by reference. One of ordinary skill would also be knowledgeable about computer science and software and programming systems and methods sufficient to implement the functionality and capabilities described in detail herein in their own hardware environments without undue experimentation.

NON-LIMITING DEFINITIONS

A "device-independent color space" is any standard color space that is commonly used to define or describe color, e.g. CIE XYZ, CIE L*a*b*, CIE L*u*v*, sRGB etc.

A "device-dependent color space" is a color space that is non-standard and cannot be used to commonly define colors without additional information such as the characteristics of the rendering device. For example, the commonly used CMYK color space for 4-color printers is a device-dependent color space since the rendering of a given CMYK color could yield very different (device-independent) colors from one model of a printer to another model of a printer. As another example, the non-standard RGB space is also a device-dependent color space since the rendering of an RGB image could appear differently from one model of a CRT monitor to another model of a CRT monitor.

A "color separation" refers to an individual separation corresponding to one of the colorants of a target marking system. For example, there are 4 separations: C, M, Y, K for a 4-color CMYK printer. Combinations of all color separations can be used to produce a range of colors by the target marking system.

A "single color separation" or "single-separation color" refers to a color specified with only one of the color separations for a target marking system. For example, for a CMYK printer, a C-only test patch is a single-separation color test patch.

A "multi-separation color" refers to a color specified with more than one of the color separations for a target marking system. For example, for a CMYK printer, a red test color is a multi-separation color test patch, using combinations of M and Y separations at some pre-determined levels.

A "colorant" refers to the medium used for rendering a particular color separation which, in forming a multi-colored image, is combined with one or more other colorants to achieve image colors throughout the spectrum. Each color separation thus may have its own corresponding colorant.

A "forward printer model" converts values in a device-dependent color space to values in a device-independent color space for a target marking system. An "inverse printer model" converts values in a device-independent color space to values in a device-dependent color space for a target marking system. A printer model can have the form of a look-up table (LUT) such as a 4-D LUT for a CMYK printer, or a parameterized fitted function such as a polynomial that relates inputs in device-dependent color space to outputs in device-independent color space. For CMYK color space as the target device-dependent color space and L*a*b* color space as the output device-independent color space, updating the forward printer model includes, for example, for each of a selected number of the nodes: (a) printing a patch using the specified CMYK components; (b) measuring the color L*a*b* of this printed patch; (c) compiling the relationship between this input CMYK specified and its corresponding measured output L*a*b* for each node; and finally (4) storing these compiled relationships of all the nodes in the form of a LUT. This LUT can now be used to map any CMYK in device-dependent color space to its predicted output L*a*b* in the device-independent color space for a target marking system, and is thus the printer model for this target marking system.

An "engine response curve" (ERC) gives the relationship between the measured lightness L* or color (L*,a*,b*) developed on the paper or on an internal media, and the input contone gray level. The ERC is estimated by printing a series of strips at different input gray levels and measuring their corresponding lightness L* or deltaE to paper to form a curve of lightness or deltaE to paper as a function of gray level. This curve is inverted to determine the corresponding colorant change needed in the gray level for an observed lightness variation at each input gray level. An example engine response curve is shown and discussed with respect to FIG. 6.

"Color variance" is the variance of raw color data measured from an image. Typically this raw data is further processed by a mathematical definition for determining a given image quality metric.

An "image quality metric" or "IQ metric" is a mathematical definition for determining a given image quality defect, such as, for instance, graininess (micro-uniformity), mottle (macro-uniformity), banding, streaking, and temporal color variation. The term image quality metric can also be used to describe the underlying variation of raw color data, from which the higher-level metrics listed above are calculated. One example of image quality metrics is described in *International Print Quality Standard*—ISO/IEC 13660:2001. This standard specifies device-independent image quality metrics, measurement methods, and analytical procedures to describe the quality of output images from hardcopy devices and is applicable to human-readable documents composed of binary monochrome images produced from impact printers, non-impact printers, and copiers.

"Graininess", as defined by ISO-13660, is the aperiodic fluctuation of density at a spatial frequency greater than 0.4 cycles per millimeter in all directions. Other definitions, such as with different spatial frequency ranges and/or measuring fluctuation at different color space (e.g. L* rather than density), exist as well. Methods to quantify graininess are well established. One method is to print and measure a test target consisting of a gray tone scale from 0% tint (white) to 100% (black) in 10% steps. Color tone sweeps like cyan, magenta, yellow, red, green, and blue may also be included in the target. Depending on the sample being measured, it might be desirable to perform more than one graininess measurement per patch to reduce errors introduced by sample variability. For samples with lower perceived graininess, consider making multiple measurements and calculating the average reflectance and average graininess values. In one embodiment, graininess is calculated as follows:

$$G = e^{-1.8D} \times \sum_{f_n} V(f_n) \times \sqrt{P'(f_n)},$$

where D is the density, $V(f_n)$ is visual transfer function as function of the mean density level and deviation from the mean, and $P'(f_n)$ is the power spectrum (compensating for aperture)

"Banding" consists of either horizontal or vertical bands, with a period that gradually varies from a minimum to a maximum value. Banding can thus be defined as a 1D image density variation in the process direction. It is often periodic and it can result from errors in the mechanical motion of rotating components, such as gears, pinions, and rollers in the charging and development subsystems, photoreceptors and their drive trains, or the ROS polygon, within a marking engine. Methods for measuring the banding induced density variation use an imaging system such as an offline scanner or in-situ sensors known as Enhanced Toner Area Coverage Sensors ("ETACS"). ETACS are used to measure the density of toner or colorant applied to or developed on a photoconductive member. Methods for measuring banding require an accurate profile of the density variation. Since the density variation is periodic, it can be characterized in terms of frequency (using Fourier analysis).

"Mottle" is the irregular arrangement of patches of color on an output print due to defective toner transfer from the belt to the image forming surface. Mottle is similar to graininess, but on a larger spatial scale (>250 μm). Various metrics have been developed by vendors, some proprietary, which are used to determine lightness variation of mottle. ISO-13660:2001 defines mottle as the Standard Deviation (STD) of Optical Density (OD) (rather than L*) between 1.27×1.27 mm² and 12.7×12.7 mm² scale over a defined spatial frequency. Xerox, in one embodiment, defines mottle as the standard deviation of L* (together with an OD correction) between 1.1×1.1 mm² and 5.5×5.5 mm² scale.

"Streaking" is pseudo-random one-dimensional defects in an image that run parallel to the process direction. Typical defects might arise from a non-uniform LED imager, contamination of the high voltage elements in a charger, scratches in the photoreceptor surface, etc. Graininess and mottle are usually not directionally oriented whereas streaks usually are.

"Temporal color variation" occurs when a first color printed at time T1 visually differs from the same color printed at time T2. Color variation is generally assessed by a color difference formula, ΔE (e.g. CIE DeltaE 2000). The ΔE's between individual measurements and their averages is an indication of the spatial or temporal non-uniformity of the output device depending on how the individual measurements were made.

General Discussion

As discussed in the background section hereof, an IQ database must be updated by subsequently printing and measuring of large numbers of color patches. This repeated operation is time consuming in effort and wastes paper and other resources. The present system and method updates the IQ metric database with reference to two times T1 and T2. At time T1, an accurate image noise defect database of interest (e.g. NMF) is built, e.g., by printing and measuring test patterns with repeats at a defined set of device-dependent colorant specifications. At time T2, when an update is called for, IQ metric values for the set of device-dependent colorant specifications are estimated by printing and measuring test patches for only the subset of device-dependent colorant specifications, and a second model is derived which is based upon the measurements at T2. Model-predicted IQ metric values are produced for the set of device-dependent colorant specifications. By adding the corresponding stored error terms at T1 to the model-predicted values at T2, IQ metric values can be approximated for the set of device-dependent colorant specifications at the current time T2. Entries of the IQ metric database can be updated accordingly and the accuracy can be thus retained over time.

Example of IQ Metric Stored Overtime with Error Compensation

Reference is now being made to FIG. 1 which is a list of entries in a file, such as a database, illustrating various 2-D image quality metrics stored over time. Two instances in time are shown T1 at 102 and T2 at 104. In this example, T1 is assumed to have occurred prior to time T2. Any drift to the imaging marking device would occur after time T1.

"Measured IQ Metric" column 110 is a series of IQ metrics that are measured and stored across the entire color space or gamut. Techniques for measuring and storing IQ metrics across an entire color space are well established. A series of "Model-Predicted Values" in column 112 are then calculated using the techniques described below with reference to FIGS. 3-12. These techniques, for example, were first described in co-pending U.S. patent application Ser. No. 12/727,692, entitled, "Image Quality Performance For A Color Marking Device", with inventors Wencheng Wu and Edul N. Dalal, and commonly assigned herewith to Xerox Corporation, the teachings of which are incorporated hereinto in their entirety. Other techniques such as using low-resolution approximation or polynomial fitting described later can also be employed in the alternative.

An "Error Value" in "Error" column 114 is calculated between each of the "Model-Predicted Values" from the "IQ Model" column 112 and the "Measured Values" in "Measure IQ Metric" column 110. One can think of "Error Value" as the data that captures the imperfection of the "Model-Predicted Value". For example in row 3 denoted 150, the "Error Value 3" represents the difference between the "Measured Value 3" of the "Measured IQ Metric" column 110 and the "Model-Predicted Value 3" in the "IQ Model" column 112. Continuing along this same row 3, at time T2 104, another "Model-Predicted Value 3" is calculated. The "Error Value 3" of "Error" column 114 is then added to this "Model Predicted-Value 3" in "IQ Model" column 112 to provide the corrected value in "Corrected" column 128. The inventors have discovered for many IQ metrics, that the error is time-invariant. Stated differently, once the error value in "Error" column 114 is calculated, this "Error Value" may not significantly change over time. "Corrected" column 128 is the sum of "Error Value" and "Model-Predicted Value at T2", which is also the "Measured IQ Metric at T1" plus "Model-Predicted Value at T2" minus "Model-Predicted Value at T1", since "Error Value" is the difference between "Measured IQ Metric at T1" and "Model-Predicted Value at T1". Hence one can think of this as a way to correct the IQ metric at T2 by the IQ measured at T1 plus the estimated printer drift. Here the estimated printer drift is "Model-Predicted Value at T2" minus "Model-Predicted Value at T1".

Example Functional Block Diagram of Updating IQ Metric Database

Reference is now being made to FIG. 2 which is a functional block diagram illustrating one example embodiment of updating an image quality metric database. There are two distinct time instances in time T1 and T2. The top-half is time T1 with steps 202, 204, 206, 208 and 210. The bottom-half is time T2 with steps 252, 256, 258, and 260.

Beginning with step 202, the series of IQ Metrics are measured across the entire color space or gamut and stored in IQ Metric Database, 204 and 220. These IQ Metrics correspond to the entries "Measured Value" in "Measure IQ Metric" column 110 of FIG. 1. There are two estimation sections: Estimation 1 section 206 and Estimation 2 section 256 which are denoted in broken lines. In Estimation 1, each "Model-Predicted Value" of "IQ Model" column 112 in FIG. 1 is calculated using the techniques described below with reference to FIGS. 3-12. Although described in greater detail below, the sub-elements of Estimation 1 are shown for completeness. Briefly in the Estimation 1 section 206, an IQ Model 236 is derived in step 216 based on the measurement for a subset of colors. Then, in sub-element 226, the entire color space (i.e. the set) is predicted using the derived IQ model 236. Next, an "Error Value" of "Error" column 114 of FIG. 1 is calculated between each "Model-Predicted Value" from step 226 and each "Measured Value" previously stored in IQ metric database 220 in step 208. This "Error Value" is then stored in IQ Metric Database 220.

With respect to time instance T2, here a measurement of the IQ Metric in step 252 is completed for a subset of colors. Estimation 2 section 256 is performed. Another instance of IQ Model T2 286 is derived in step 266 using the measurements for a subset of colors T2 252. Then a complete "Model-Predicted Values at T2" for the entire set of colors is carried out in step 276 using the derived IQ model 286. In step 258 "Error Value" in "Error" column 114 of FIG. 1, which are stored in IQ metric database 220 at T1, are added to each "Model-Predicted Values at T2" in the complete set to obtain the complete estimation of IQ metric values at T2. Each "Corrected Value" in "Corrected" column 128 of FIG. 1 is then updated for T2 and stored back in IQ Metric Database 220 in step 260.

Embodiment for 2-D IQ Metrics, e.g., Smoothness, Mottle, Graininess

Figure 3:
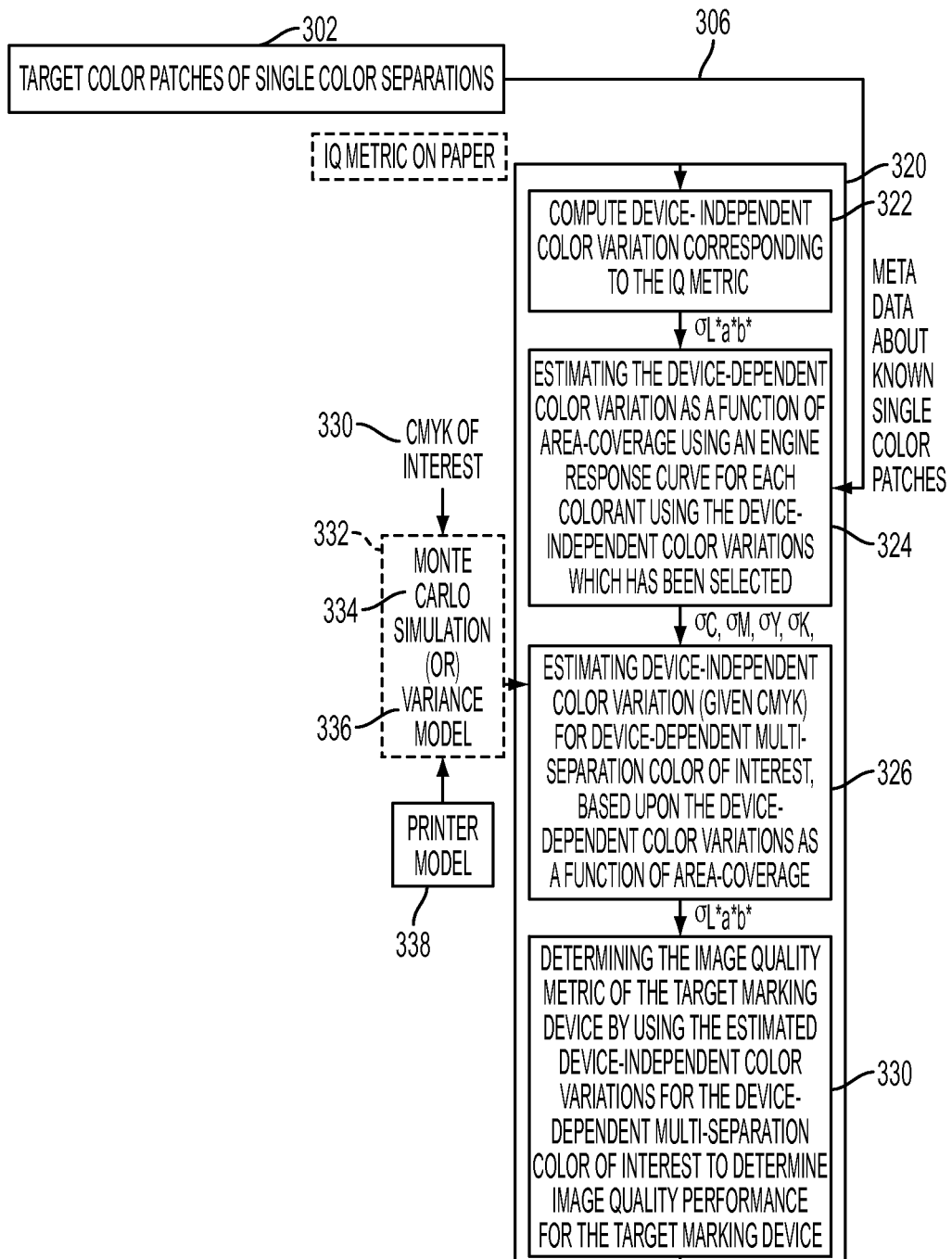
FIG. 3 is a block diagram illustrating one example embodiment for determining a 2-D image quality metric such as smoothness.

Reference is now being made to FIG. 3 which is a block diagram of an embodiment for determining estimates (206 and/or 256) of 2-D IQ metrics such as smoothness. This is a method to determine a CMYK of interest from a small sample of IQ measurements used in Estimations 1 section 206 and Estimation 2 section 256.

In block 302, data for a target color patch or patches of single color separations are sent through the color marking system. An example of a color marking system in a printing network is further described in FIG. 13 incorporating an IQ Metric Database of FIG. 2 and an IQ metric model of FIGS. 3-5. In this embodiment, noise mottle frequency (NMF) is the metric selected but, as described with reference to FIGS. 4 and 5, other IQ metrics are described as well. Depending on the print quality standard definition used for the IQ metric being measured in the patch, for example high spatial frequency noise, the sensitivity a* and b* may be less important. Specifically, for the IQ metric of mottle, the values of a*, b* are not needed in many industry definitions of NMF. However, this is not a limitation of this invention. The method is also well suited for the definition of color mottle or 2D color noises that take a* and b* into account. An example for 2-D IQ metrics for determining non-structured noises/defects such as smoothness, mottle, graininess, etc. is shown. For structured (e.g. banding, moiré) and synchronized (e.g. streaks) defects, decomposition is not required as shown in the other IQ metrics described with reference to FIGS. 4-5 below.

The colors L* for mottle are obtained from the scanned test patches. These colors L* are averaged to produce the average L* value that is converted using the following equation for optical density (OD) to obtain the average optical density for the test patches. Device-independent color variations corresponding to the IQ metric are computed. The noise distributions in NMF spatial frequency range are measured. Given a two dimensional L* pixel map of the test patches, each pixel has a different L* value. Depending on the print quality standard definition being used for mottle the perceptual weights are not stripped out. In the case of a mottle definition (such as NMF) where the perceptual weights are important they are stripped or subtracted out in block 322 to be applied later in block 330. The NMF is calculated from the manipulated L* values of the scanned image. From the mottle frequency, a standard deviation can be calculated. That standard deviation, multiplied by 100, is corrected by the optical density (OD) as shown in EQ. 1. This gives us the NMF value for the test patches. The perceptual weighting is based upon a LUT of survey data which relates optical density to the Human Visual System (HVS).

In the definition of mottle that include perceptual weights, the L* values are converted to OD using the following relationship:

$$Y = \begin{cases} \left(\frac{L^* + 16}{116}\right)^3 & L^* \geq 7.9996 \\ L^*/903.3 & \text{otherwise} \end{cases} \quad (1)$$

$$OD = -\log_{10}(Y)$$

Again, for many standard definitions for mottle, only L* is mapped because *a and b* are not important in this definition.

Figure 6:
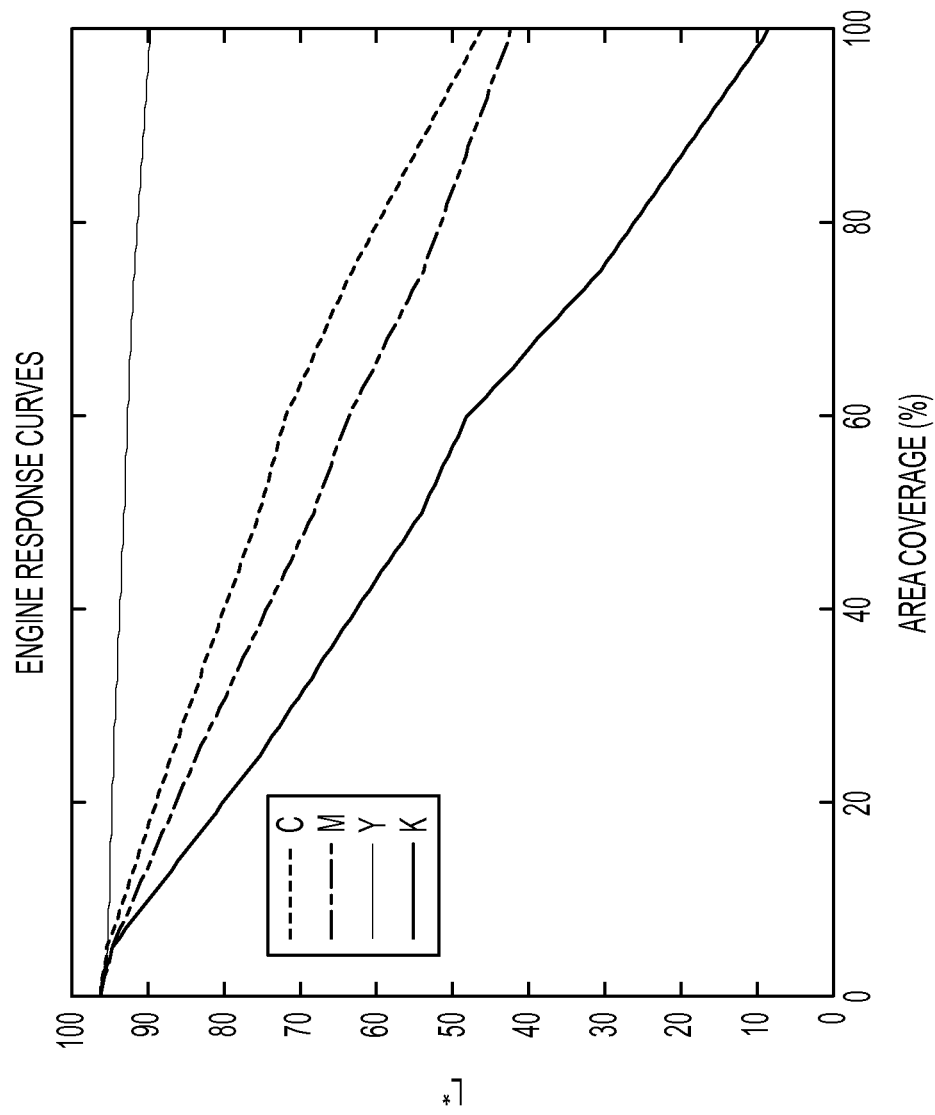
FIG. 6 is an example engine response curve used and discussed with respect to the example block diagrams of FIGS. 3-5.
Figure 7:
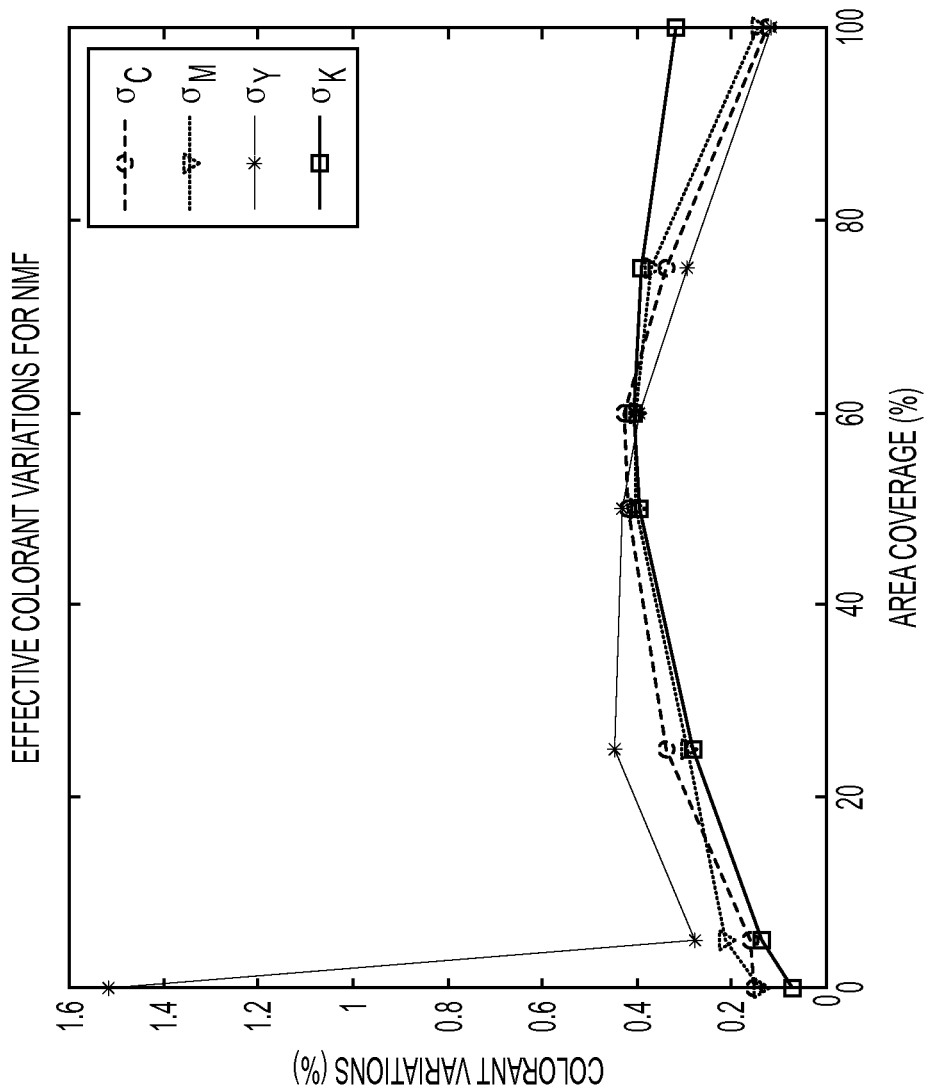
FIG. 7 is an example colorant variation curve for NMF used and discussed with respect to the example block diagrams of FIGS. 3-5.

Next the variance of the device-dependent color variations of color $\sigma_{L^*a^*b^*}$ is converted to a device-independent colorant variance value, such as $\sigma_{CMYK}$, using area-coverage of an engine response curve (ERC) 324, such as that shown in FIG. 6, for the known single color separation data for the target color patch of block 302. Lightness variations are converted to colorant variations in functional block 324. These colorant variations are used to construct the NMF colorant variation curves. FIG. 7 shows an example of converted colorant variations for NMF, which is area-coverage dependent. To select the correct NMF colorant variation curves, the metadata 306 of the target color patches of single color separations is used. For IQ metrics where the contributions from a* and b* are important, two more sets of converted colorant variations for each IQ metric, i.e., one for a* and one for b*, are also constructed. These two additional converted colorant variations are in addition to the colorant variation shown in FIG. 7.

Interpolation can be performed if necessary. As an example, let us assume that a test patch is measured at an area coverage of 50% black, and the NMF L* standard deviation (i.e. $\sigma_L^*$) is found to be around 5. The standard deviation 5 is the color variation at mottle frequency. The reason it is not zero is because the marking device or printer is not perfect. Stated differently, when the target color patches of single color separations are created by the marking device for 50% black, every pixel is not exactly at 50%. Some pixels are above 50% black while other pixels are below 50% black, and so on. Referring to the ERC in FIG. 6, it can be seen that L*=50±5 can be used to determine the corresponding area coverage for the range and thus determine the corresponding colorant variation for NMF at 50% black. Here are more details about this conversion. To convert color (say L*) variation to colorant variation (say black, K), one can use the ERC in FIG. 7. For example, for a given variation L*=50±5, where 5 is the standard deviation, the corresponding colorant variation in K can be estimated by $(K_1-K_2)/2$, where one passes L*=50−5 to the K-ERC to get $K_1$ and L*=50+5 to the K-ERC to get $K_2$. By repeating this process for different area-coverages of K, the colorant variation of K for NMF is determined as shown in FIG. 7. Similarly, by repeating the process for C, M, Y respectively, the colorant variation of C, M, Y for NMF are determined. The result from an experiment is shown in FIG. 7. This completes 324. The NMF colorant variation curves shown in FIG. 7 can be used in 326. As an example, assuming the following area coverages C=40%, M=40%, Y=0%, and K=30%. Using the NMF colorant variation curves in FIG. 7 the value of $\sigma_c$ is determined at 40%. An examination of the cyan curve on the color variation plot for NMF in FIG. 7 shows that an area coverage of cyan at 40% yields (by interpolation) $\sigma_c \approx 0.4$. Similarly, for an area coverage of magenta at 40%, we determine that $\sigma_m \approx 0.4$. For an area coverage of Y=0%, $\sigma_y \approx 1.5$. For an area coverage of K=30%, $\sigma_k \approx 0.4$.

At 326, the device-independent lightness variations are projected or estimated as device-independent color variations for any given multi-separation CMYK combinations of interest. This estimation of the device-independent color variation for a given CMYK is based upon the device-dependent color variations as a function of area-coverage. An overview of this novel projection technique is first described followed by a detailed mathematical example. It should be appreciated that the dashed box 332 in FIGS. 3, 4 and 5 denotes an optional embodiment. In one optional embodiment, a variance is imposed 332 using a Monte Carlo simulation 334 with NMF colorant variation curves and assume noise characteristics is normal distribution. In another optional embodiment, lightness variations for any given CMYK combination is projected via a variance model 336 with NMF colorant variation curves, the Jacobian of the nominal printer model 338. In this step, it is assumed that noises or variations in single-separations independently contribute to any CMYK combination while the colorant interaction captured in printer model 338 is only in the mean not in the variation. In another embodiment, the correlations using the variance model 336 approach by sparsely measuring additional test patches of multi-separation CMYK. However, this adds additional measurement cost and is not necessary for the IQ metric of mottle. One main difference between the two variance approaches in 332 is how the resulting variances are assessed. In one approach, the printer model 338 is used with Monte Carlo simulation 334 while alternatively the local Jacobian is used with the variance model 336. When the operational ranges are close to linear locally, both yield essentially the same result. The variance model 336 approach has lower computational costs. But when the operational ranges are highly non-linear for instance, the colorant variations are too large due to poor image marking device or printer performance or the CMYK color of interest 330 happens to have a very non-linear response in that portion of the printer model, a Monte Carlo simulation 334 will yield better results and may be preferred if the additional computational costs are acceptable.

At 330, the image quality metric (in this example NMF) of the target marking device is determined by using the estimated device-independent color variations for the device-dependent multi-separation color of interest to determine the image quality metric for the target marking device. For this example, the mottle definition uses the perceptual weight, and these are applied to the projected variance of $\sigma_{L^*a^*b^*}$ from 326. The projected or estimated NMF for the CMYK of interest 330 is given by combining the calculated perceptual weights (function of L*, calculated from nominal printer model 338) and the projected $\sigma_{L^*a^*b^*}$. More specifically, a model is derived for relating independent colorant variations $\sigma_{CMYK}$ to lightness variations $\sigma_{L^*a^*b^*}$ via a Jacobian of the printer model 338 for the target marking device or printer.

Mathematical Description of Projection Technique

For L*, let $f(\bullet)$ be the functional form, which can be stored in a look up table (LUT) that describes the printer model for lightness, i.e. L*=$f$(C,M,Y,K). Assume that for a given color of interest $(C_0, M_0, Y_0, K_0)$, the colorant variations due to printer noises has the standard deviations of $(\sigma_{C0}, \sigma_{M0}, \sigma_{Y0}, \sigma_{K0})$. Assuming further that these colorant variations are independently distributed, then the resulting lightness (L*) variation $\sigma_{L=L0}$, satisfies the following EQ. 2 (component of variances):

$$(\sigma_{L=L_0})^2 = \left(\frac{\partial f}{\partial c}\bigg|_{c=c_0}\right)^2 (\sigma_{c_0})^2 + \left(\frac{\partial f}{\partial m}\bigg|_{m=m_0}\right)^2 (\sigma_{m_0})^2 + \left(\frac{\partial f}{\partial y}\bigg|_{y=y_0}\right)^2 (\sigma_{y_0})^2 + \left(\frac{\partial f}{\partial k}\bigg|_{k=k_0}\right)^2 (\sigma_{k_0})^2 \quad (2)$$

That is, the color variance ($\sigma^2$) of the printer model output L is a linear combination of the individual variances with the square of the local Jacobian slopes.

Likewise in those image quality metrics where a* and b* contributions are desired, for a*, let $g(\bullet)$ be the functional form, which can be stored in a look up table (LUT) that describes the printer model for a*, i.e. a*=g(C,M,Y,K). Assume that for a given color of interest $(C_0, M_0, Y_0, K_0)$, the colorant variations due to printer noises have the standard deviations of $(\sigma_{C0}, \sigma_{M0}, \sigma_{Y0}, \sigma_{K0})$. Assuming further that these colorant variations are independently distributed, then the resulting a* variation $\sigma_{a=a0}$, satisfies the following EQ. 3 (component of variances):

$$(\sigma_{a=a_0})^2 = \left(\frac{\partial g}{\partial c}\bigg|_{c=c_0}\right)^2 (\sigma_{c_0})^2 + \left(\frac{\partial g}{\partial m}\bigg|_{m=m_0}\right)^2 (\sigma_{m_0})^2 + \left(\frac{\partial g}{\partial y}\bigg|_{y=y_0}\right)^2 (\sigma_{y_0})^2 + \left(\frac{\partial g}{\partial k}\bigg|_{k=k_0}\right)^2 (\sigma_{k_0})^2 \quad (3)$$

For b*, let $h(\bullet)$ be the functional form, which can be stored in a look up table (LUT) that describes the printer model for b*, i.e. b*=h(C,M,Y,K). Assume that for a given color of interest $(C_0, M_0, Y_0, K_0)$, the colorant variations due to printer noises have the standard deviations of $(\sigma_{C0}, \sigma_{M0}, \sigma_{Y0}, \sigma_{K0})$.

Assuming further that these colorant variations are independently distributed, then the resulting b* variation $\sigma_{b=b0}$, satisfies the following EQ. 4 (component of variances):

$$(\sigma_{b=b0})^2 = \left(\frac{\partial h}{\partial c}\bigg|_{c=c_0}\right)^2 (\sigma_{c_0})^2 + \left(\frac{\partial h}{\partial m}\bigg|_{m=m_0}\right)^2 (\sigma_{m_0})^2 + \left(\frac{\partial h}{\partial y}\bigg|_{y=y_0}\right)^2 (\sigma_{y_0})^2 + \left(\frac{\partial h}{\partial k}\bigg|_{k=k_0}\right)^2 (\sigma_{k_0})^2 \quad (4)$$

In the case of the variance model 336, this is extended to project or estimate variance model to include correlation i.e. remove the above-described restriction that the colorant variations are independently distributed.

Similar to EQ. 2, one can relieve the independence constraint by adding correlation terms. That is:

$$\sigma_L^2 = \begin{bmatrix} \left(\frac{\partial f}{\partial c}\right)^2 & \rho_{cm}\frac{\partial f}{\partial c}\frac{\partial f}{\partial m} & \rho_{cy}\frac{\partial f}{\partial c}\frac{\partial f}{\partial y} & \rho_{ck}\frac{\partial f}{\partial c}\frac{\partial f}{\partial k} \\ \rho_{cm}\frac{\partial f}{\partial c}\frac{\partial f}{\partial m} & \left(\frac{\partial f}{\partial m}\right)^2 & \rho_{my}\frac{\partial f}{\partial m}\frac{\partial f}{\partial y} & \rho_{mk}\frac{\partial f}{\partial m}\frac{\partial f}{\partial k} \\ \rho_{cy}\frac{\partial f}{\partial c}\frac{\partial f}{\partial y} & \rho_{my}\frac{\partial f}{\partial m}\frac{\partial f}{\partial y} & \left(\frac{\partial f}{\partial y}\right)^2 & \rho_{yk}\frac{\partial f}{\partial y}\frac{\partial f}{\partial k} \\ \rho_{ck}\frac{\partial f}{\partial c}\frac{\partial f}{\partial k} & \rho_{mk}\frac{\partial f}{\partial m}\frac{\partial f}{\partial k} & \rho_{yk}\frac{\partial f}{\partial y}\frac{\partial f}{\partial k} & \left(\frac{\partial f}{\partial k}\right)^2 \end{bmatrix} \begin{bmatrix} \sigma_c^2 \\ \sigma_m^2 \\ \sigma_y^2 \\ \sigma_k^2 \end{bmatrix} \quad (5)$$

for $c = c_0, m = m_0, y = y_0, k = k_0$.

Note that $\rho_{CM}$ is the correlation coefficient (from −1 to 1) between C&M. It is zero when the colorants are independent (thus EQ. 2 reduces to EQ. 5).

Likewise for a*, $$\sigma_a^2 = \begin{bmatrix} \left(\frac{\partial g}{\partial c}\right)^2 & \rho_{cm}\frac{\partial g}{\partial c}\frac{\partial g}{\partial m} & \rho_{cy}\frac{\partial g}{\partial c}\frac{\partial g}{\partial y} & \rho_{ck}\frac{\partial g}{\partial c}\frac{\partial g}{\partial k} \\ \rho_{cm}\frac{\partial g}{\partial c}\frac{\partial g}{\partial m} & \left(\frac{\partial g}{\partial m}\right)^2 & \rho_{my}\frac{\partial g}{\partial m}\frac{\partial g}{\partial y} & \rho_{mk}\frac{\partial g}{\partial m}\frac{\partial g}{\partial k} \\ \rho_{cy}\frac{\partial g}{\partial c}\frac{\partial g}{\partial y} & \rho_{my}\frac{\partial g}{\partial m}\frac{\partial g}{\partial y} & \left(\frac{\partial g}{\partial y}\right)^2 & \rho_{yk}\frac{\partial g}{\partial y}\frac{\partial g}{\partial k} \\ \rho_{ck}\frac{\partial g}{\partial c}\frac{\partial g}{\partial k} & \rho_{mk}\frac{\partial g}{\partial m}\frac{\partial g}{\partial k} & \rho_{yk}\frac{\partial g}{\partial y}\frac{\partial g}{\partial k} & \left(\frac{\partial g}{\partial k}\right)^2 \end{bmatrix} \begin{bmatrix} \sigma_c^2 \\ \sigma_m^2 \\ \sigma_y^2 \\ \sigma_k^2 \end{bmatrix} \quad (6)$$

for $c = c_0, m = m_0, y = y_0, k = k_0$.

Likewise for b*, $$\sigma_b^2 = \begin{bmatrix} \left(\frac{\partial h}{\partial c}\right)^2 & \rho_{cm}\frac{\partial h}{\partial c}\frac{\partial h}{\partial m} & \rho_{cy}\frac{\partial h}{\partial c}\frac{\partial h}{\partial y} & \rho_{ck}\frac{\partial h}{\partial c}\frac{\partial h}{\partial k} \\ \rho_{cm}\frac{\partial h}{\partial c}\frac{\partial h}{\partial m} & \left(\frac{\partial h}{\partial m}\right)^2 & \rho_{my}\frac{\partial h}{\partial m}\frac{\partial h}{\partial y} & \rho_{mk}\frac{\partial h}{\partial m}\frac{\partial h}{\partial k} \\ \rho_{cy}\frac{\partial h}{\partial c}\frac{\partial h}{\partial y} & \rho_{my}\frac{\partial h}{\partial m}\frac{\partial h}{\partial y} & \left(\frac{\partial h}{\partial y}\right)^2 & \rho_{yk}\frac{\partial h}{\partial y}\frac{\partial h}{\partial k} \\ \rho_{ck}\frac{\partial h}{\partial c}\frac{\partial h}{\partial k} & \rho_{mk}\frac{\partial h}{\partial m}\frac{\partial h}{\partial k} & \rho_{yk}\frac{\partial h}{\partial y}\frac{\partial h}{\partial k} & \left(\frac{\partial h}{\partial k}\right)^2 \end{bmatrix} \begin{bmatrix} \sigma_c^2 \\ \sigma_m^2 \\ \sigma_y^2 \\ \sigma_k^2 \end{bmatrix} \quad (7)$$

for $c = c_0, m = m_0, y = y_0, k = k_0$.

This model is more accurate and general but requires more effort since it requires that we characterize the correlation coefficients locally for all colors of interest and assume that the identified correlation coefficients hold for a reasonable amount of time (so that constant updates are not required). It is important to note that in this second major section 320 for the 2-dimensional IQ defects such as NMF, for any given CMYK of interest 330 the corresponding NMF can be estimated over a large complex set of conditions based upon measurements taken over a small simple set of conditions for target color patches 302.

Feasibility and Performance Results

Figure 8:
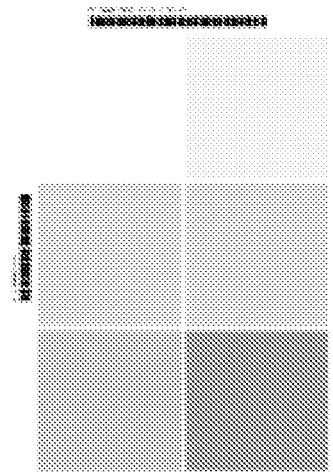
FIG. 8 shows an example single-separation test-page for Noise Mottle Frequency from a training set that includes only single-separation colors.
Figure 9:
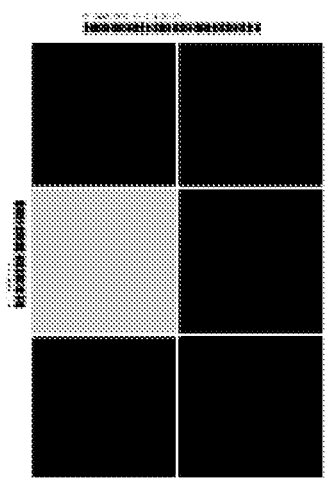
FIG. 9 shows an example testing page that includes multi-separation colors.
Figure 10:
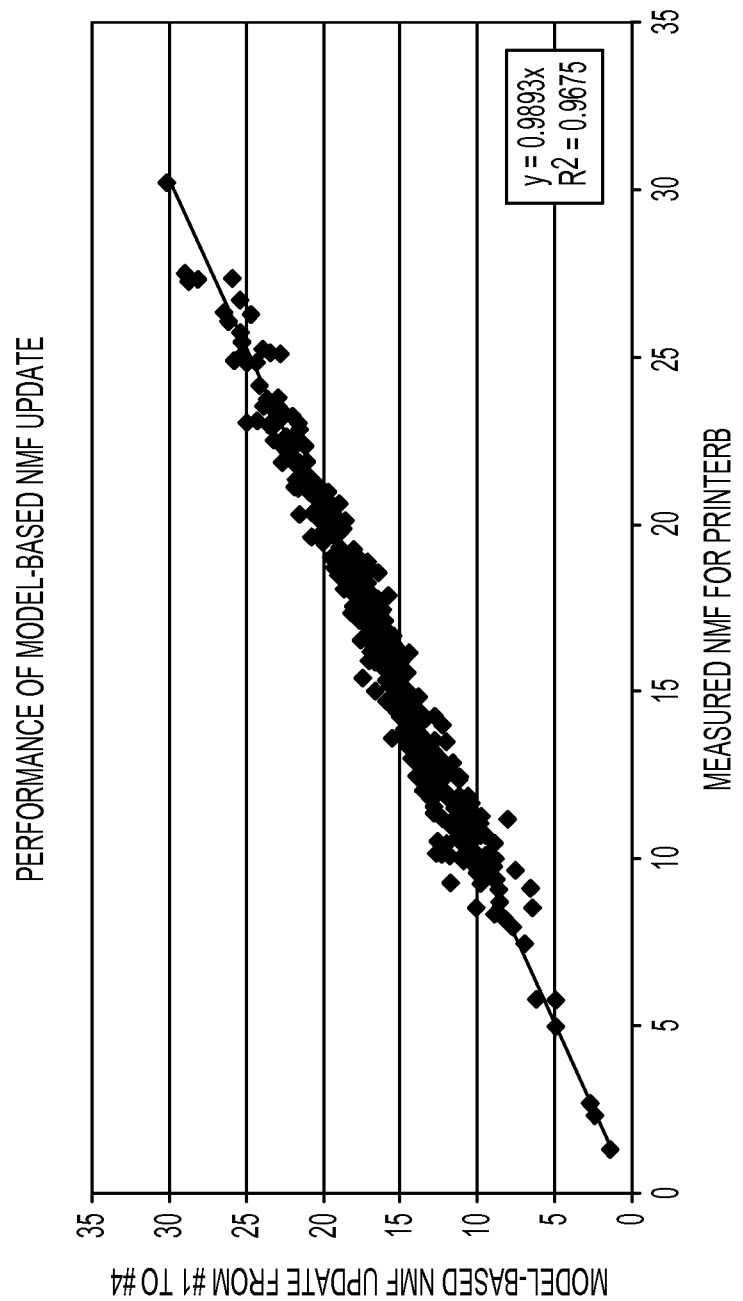
FIG. 10 is a plot of the metric model discussed with respect to FIGS. 8-9.

To demonstrate the feasibility hereof, experiments were done using PrinterA and PrinterB. First, 4 single-separation test-pages (at 5%, 25%, 50%, 60%, 75%, 100%) were printed (an example is shown in FIG. 8) for training the model, and ~100 multi-separation test-pages (at 0%, 25%, 50%, 75%, 100% nodes of CMYK, i.e. a total of $5^4$=625 patches) were printed for testing the model. An example is shown in FIG. 8. These patches were then scanned and NMF measured.

The estimation model of FIG. 3 is applied using the measurement data and scans of the 4 single-separation test pages (training set) of FIG. 8. A corresponding PrinterA or PrinterB printer model was used to predict the NMF. The result correlates well with actual NMF measurement as shown in Table 1.

TABLE 1

| | | PrinterA | PrinterB#1 | PrinterB#2 | PrinterB#3 | PrinterB#4 | PrinterB#5 | PrinterB#6 |
|---|---|---|---|---|---|---|---|---|
| With Mante Carlo | Slope | 0.9909 | 1.0368 | 1.0183 | 1.0276 | 1.0167 | 1.0168 | 1.0494 |
| | $R^2$ | 72.99% | 76.91% | 78.35% | 80.91% | 83.48% | 79.55% | 80.84% |
| With Variance Model | Slope | 1.0197 | 1.033 | 1.0156 | 1.0304 | 1.0433 | 1.0057 | 1.0667 |
| | $R^2$ | 74.67% | 77.13% | 77.34% | 81.33% | 84.94% | 79.51% | 81.63% |

Some of the residual errors can be accounted for by the intrinsic page to page variations and the assumption that mottle noises are contributed independently from each separation. Note that the good correlation indicates that the independence assumption is quite reasonable. The performance of the Monte Carlo approach and the variance model are similar. Thus, using the variance model may be preferred for many devices. In this embodiment, the estimated image noise values described above are made more accurate over time by updating an IQ metric database or image noise defect (e.g. mottle) database to account for image marking device of printer drift as described above in the functional block diagram of FIG. 2.

For illustration, we have applied the teachings hereof to the same experimental data discussed above using a variance model as the IQ modeling method for T1 and T2. In particular, the data acquired for PrinterB#1 is considered as T1; and the data acquired for PrinterB#4 is T2. These data are from the same printer, PrinterB, but at two different times (about one week apart). First, the error-terms, which are the differences between actual measurements of NMF and the variance-model predicted NMF values for all 625 colors, are calculated using data at T1, PrinterB#1. At T2, PrinterB#4, the updated estimates of NMF are then computed by adding these error terms calculated at T1 to the variance model predicted NMF derived at T2 for all 625 colors. The updated result for PrinterB#4 is shown in FIG. 12. Comparing this result to that in FIG. 11, where only the variance model predicted NMF derived at T2 is used, it is clear that this invention improves the accuracy greatly. This accuracy comes at the expense of a "one-time" cost of measuring all 625 colors at T1 for deriving the error-terms.

Embodiment for Color Stability and Color Uniformity IQ Metrics

Figure 4:
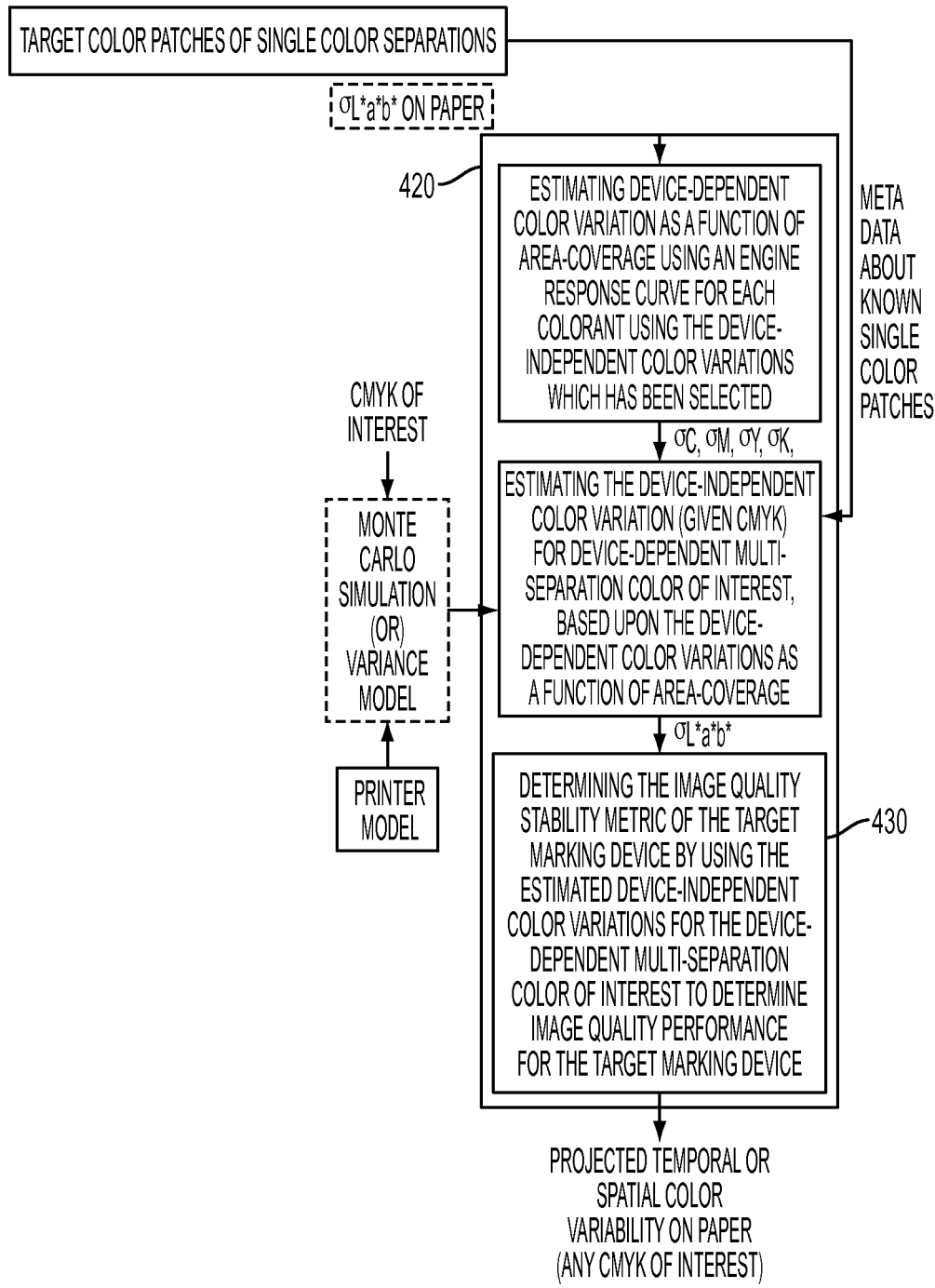
FIG. 4 is a block diagram of one example embodiment for determining an image quality metric such as color stability and/or color uniformity.

Reference is now being made to FIG. 4, which is a block diagram of an embodiment for determining IQ metrics such as color stability and/or color uniformity. To avoid duplication and for sake of brevity, only those portions of FIG. 4 which differ from block diagram FIG. 3 are described.

To begin, notice the calibrated on-belt sensor 412. For this example, the data is in spatial L*a*b*(x,y) or temporal L*a*b*(t) form, which is fed to an IQ metric calculation 414. This is important especially in applications where gradual color variations across the page are important. One example is a "multi-up" print job where multiple identical images are formed on a single sheet, such as, a sheet of business card graphics, or identical photographs. The stripping and applying of perceptual weights in 322 and 330 are not shown in section 420 because the standard definition of the IQ metric of color stability and color variations do not need these steps. A calculation in 430 is made for the color difference formula ΔE. This is a measurement of the magnitude of difference between two colors. One example of a difference formula is defined by CIE Publication 142-2001, the teachings of which are hereby incorporated by reference hereinto in their entirety.

Likewise for FIG. 4, it is important to note that in this second major section 420 for the color stability or color variation IQ metric, or device-independent color variation can be estimated over a large complex set of conditions based upon device-dependent color measurements taken over a small simple set of conditions for target color patches 302.

Embodiment for Banding IQ Metrics

Figure 5:
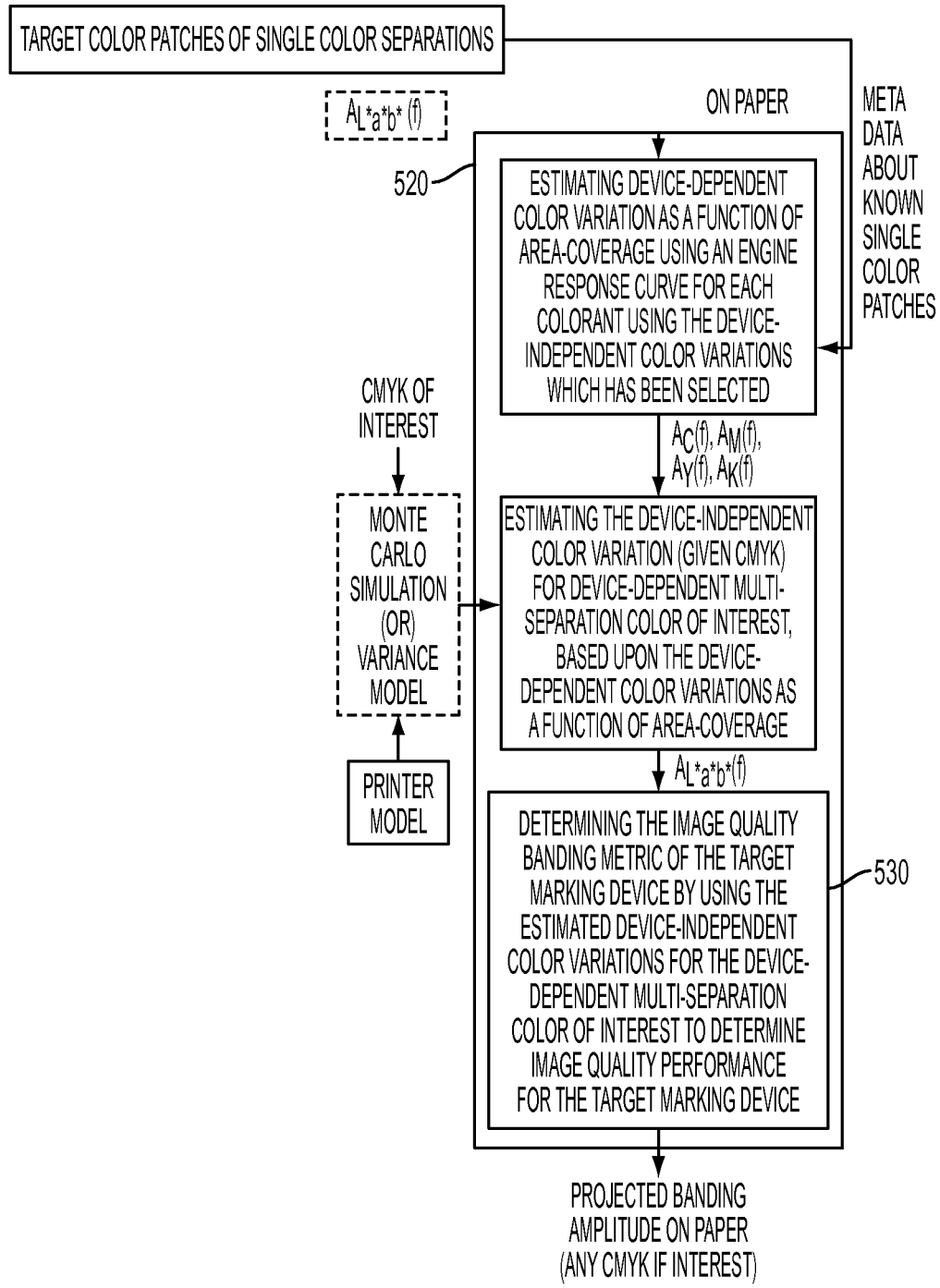
FIG. 5 is a block diagram of one example embodiment for determining an image quality metric such as banding.

Reference is now being made to FIG. 5, which is a block diagram of an embodiment for determining IQ metrics such as banding. Again, to avoid duplication and for sake of brevity, only those portions of FIG. 5 which differ from the block diagram of FIG. 3 are described.

Calibrated on-belt sensor 412 (as described in FIG. 2 at 220 and FIG. 14 at 1486) measures on-belt data. For this example the data is in spatial L*a*b*(x,y) which is subjected to a Fourier Analysis 514 to find the spatial frequencies to produce $A_{L^*a^*b^*}(\overline{\omega})$, where $A_{L^*a^*b^*}(\overline{\omega})$ represents amplitude as a function of frequency. Banding is typically periodic, caused by, for example, an out-of-round drum or roller. The $A_{L^*a^*b^*}(\overline{\omega})$ provides the spectrum of the several different frequencies of interest. Again, the stripping and applying of perceptual weights in 322 and 328 are not shown in section 520 because the definition of color stability and color variations do not need these steps. For this example, in step 530 the image quality banding metric of the target marking device is determined by using the estimated device-independent color variations for the device-dependent multi-separation color of interest. The image quality banding metric is used to determine image quality metric for the target marking device. The equations for banding will next be described.

Let ƒ(•) be the functional form, which can be stored in a look up table (LUT) that describes the printer model for lightness, i.e., L*=ƒ(C,M,Y,K). Assume that for a given color of interest $(C_0, M_0, Y_0, K_0)$, the colorant variations due to printer noises has the standard deviations of $(A_{C0}, A_{M0}, A_{Y0}, A_{K0})$. Assuming further that these colorant variations are independently distributed, then the resulting lightness (L*) variation $\sigma_{L=L0}$, satisfies the following EQ. 8 (component of variances):

$$(A_{L=L_0})^2 = \left(\frac{\partial f}{\partial c}\bigg|_{c=c_0}\right)^2 (A_{c_0})^2 + \left(\frac{\partial f}{\partial m}\bigg|_{m=m_0}\right)^2 (A_{m_0})^2 + \left(\frac{\partial f}{\partial y}\bigg|_{y=y_0}\right)^2 (A_{y_0})^2 + \left(\frac{\partial f}{\partial k}\bigg|_{k=k_0}\right)^2 (A_{k_0})^2 \quad (8)$$

That is, the amplitude as a function of frequency $\overline{\omega}$ ($A(\overline{\omega})$) of the printer model output L is the linear combination of the individual variances with the square of the local Jacobian slopes. EQ. 9 predicts the worst case scenario since the phase interactions among C/M/Y/K are ignored and all positive terms in the right hand side of the equation are used. This can be improved by adding phase dependency to EQ. 10. Alternatively, phases can be incorporated in the Monte Carlo simulation with various cmyk phase combinations to assess the potential range of banding amplitudes for the given color of interest $(C_0, M_0, Y_0, K_0)$.

Likewise in those IQ metrics where a* and b* contributions are desired, for a* let g(•) be the functional form, which can be stored in a look up table (LUT) that describes the printer model for a*, i.e. a*=g(C,M,Y,K). Assume that for a given color of interest $(C_0, M_0, Y_0, K_0)$, the colorant variations due to printer noises has the standard deviations of $(\sigma_{C0}, \sigma_{M0}, \sigma_{Y0}, \sigma_{K0})$. Assuming further that these colorant variations are independently distributed, then the resulting a* variation $\sigma_{a=a0}$, satisfies the following EQ. 10 (component of variances):

$$(A_{a=a_0})^2 = \left(\frac{\partial g}{\partial c}\bigg|_{c=c_0}\right)^2 (A_{c_0})^2 + \left(\frac{\partial g}{\partial m}\bigg|_{m=m_0}\right)^2 (A_{m_0})^2 + \left(\frac{\partial g}{\partial y}\bigg|_{y=y_0}\right)^2 (A_{y_0})^2 + \left(\frac{\partial g}{\partial k}\bigg|_{k=k_0}\right)^2 (A_{k_0})^2 \quad (9)$$

For b* let h(•) be the functional form, which can be stored in a look up table (LUT) that describes the printer model for b*, i.e., b*=h(C,M,Y,K). Assume that for a given color of interest $(C_0, M_0, Y_0, K_0)$, the colorant variations due to printer noises has the standard deviations of $(\sigma_{C0}, \sigma_{M0}, \sigma_{Y0}, \sigma_{K0})$. Assuming further that these colorant variations are independently distributed, then the resulting b* variation $\sigma_{b=b0}$, satisfies the following EQ. 10 (component of variances):

$$(A_{b=b_0})^2 = \left(\frac{\partial h}{\partial c}\bigg|_{c=c_0}\right)^2 (A_{c_0})^2 + \left(\frac{\partial h}{\partial m}\bigg|_{m=m_0}\right)^2 (A_{m_0})^2 + \left(\frac{\partial h}{\partial y}\bigg|_{y=y_0}\right)^2 (A_{y_0})^2 + \left(\frac{\partial h}{\partial k}\bigg|_{k=k_0}\right)^2 (\sigma_{k_0})^2 \quad (10)$$

In the case of the variance model 336, this is extended to project or estimate variance model to include correlation i.e. remove the above-described restriction of that the colorant variations are independently distributed.

A model can be formulated that is identical to Equations 3-5 above, by substituting the term σ with A($\overline{\omega}$).

Likewise for FIG. 5, it is important to note that in this second major section 520 for banding of a given frequency, at any given CMYK of interest 330 the corresponding banding can be estimated over a large complex set of conditions based upon measurements taken over a small simple set of conditions for target color patches 302. In one embodiment, the output 330, 430 and 530 of FIGS. 3-5 are used to predict image quality metric of the target marking device. In various embodiments, the estimated device-independent color variations can be used to predict image quality metric of the target marking device. The image quality metric can be used for performing diagnostic, tracking, performing maintenance, performing a color management parameter adjustment, device assessment, soft-proofing, workflow analysis, and notifying an operator. Other uses are intended to fall within the scope of the appended claims.

In another embodiment, nonlinearities of the image quality metric are estimated and removed from the measured image quality metrics prior to converting each of the image quality metrics to a corresponding measure of device-independent color variation; and re-inserting the estimated nonlinearities into the measured image quality metrics prior to estimating the corresponding area-coverage dependent noise distribution. Such uses to determine image quality metric include defining an application dependent function having user-selected image noise attributes as inputs and providing those attributes and the estimated image noise metric values to the function. A spot color recipe can be selected based upon the output of the function. A color profile can be derived from an output of the function.

Image noise metric values can be compared against a manufacturer's specification or a user-defined specification, and based upon the comparison, the image noise level of the target marking device can be determined relative to a defined noise tolerance level. The image noise levels of the target marking device can be used for performing a diagnostic and/or performing a maintenance on the target marking device, or for notifying an operator of the target marking device that the noise levels have exceeded (or are anticipated to exceed) desired levels.

A current state of the target marking device can be determined based upon the estimated image noise metric values and used as a basis for performing a color management parameter adjustment, a device assessment, soft-proofing, and workflow analysis. Image noise metric values can be collected over time and stored in a historical database. Such values can be used to project when the target marking device will reach a defined noise tolerance threshold. These projections can be based upon any of: a time, a date, a count of a number of pages printed by the target marking device, and a number of hours of operation of the target marking device.

Embodiment for Modeling IQ Metrics with Polynomial Functions

In this embodiment, an alternative method for modeling an IQ metric database using measurement for a subset of colors and a set of polynomial functions is discussed. Unlike the other embodiments, this embodiment does not utilize knowledge of the characteristics of specific IQ defects, thus is more flexible in the selection of the subset of colors. Moreover, in this embodiment the device-dependent color separation of a target marking device can be either single separation colors or multi-separation colors. In general the higher the number of the device-dependent color separations samples processed in the subset of the color gamut the more robust the model.

Using the IQ metric of mottle NMF as an example, let us assume that a subset of S colors is selected so that $cmyk_i$, $i_{1 \sim S}$, and their corresponding NMF values are measured, $NMF_i$. Assuming that IQ metric database for mottle can be modeled as: NMF=$f$(c,m,y,k), then the data collection of $cmyk_i$ and NMF, $i=_{1 \sim S}$, can now be used for solving the parameters in $f(\bullet)$. In one example, a linear fitting technique, such as polynomial fitting with order 1, is used as the model, i.e. NMF=$a_1 c + a_2 m + a_3 y + a_4 k + a_5$. The terms $a_j$'s are solved with the measurement data for the subset of colors by finding the least square solution of $a_j$'s. More precisely, $$[a_1 \quad a_2 \quad a_3 \quad a_4 \quad a_5] = (T^t T)^{-1} T^t M \quad (11)$$

where, $$T = \begin{bmatrix} c_1 & m_1 & y_1 & k_1 & 1 \\ c_2 & m_2 & y_2 & k_2 & 1 \\ \vdots & \vdots & \vdots & \vdots & \vdots \\ c_S & m_S & y_S & k_S & 1 \end{bmatrix} \quad (12)$$

$$M = \begin{bmatrix} NMF_1 \\ NMF_2 \\ \vdots \\ NMF_S \end{bmatrix}. \quad (13)$$

Similarly, $f(\bullet)$ can be chosen as higher order polynomials or piece-wise linear functions. There are, however, trade-offs between the order of the model fitting and the number of measurements needed in order to derive a robust model that does not over-fit the data. For this embodiment with error-correction terms, the robustness of the model is especially important. It is important to note that although a NMF IQ metric was described in this embodiment for modeling IQ metric database using measurement for a subset of colors, other IQ metrics are also applicable, such as graininess, banding, temporal color variation, and streaking.

Embodiment for Modeling IQ Metrics with Low-Resolution LUT

In this embodiment, an alternative method for modeling IQ metric database using measurement for a subset of colors, which are on the nodes of a low-resolution look-up table (LUT), is discussed. Similar to the embodiment with polynomial functions, this method does not utilize knowledge of the characteristics of specific IQ defects.

Using the IQ metric of mottle NMF as an example, one can first build a model for NMF with a low-resolution LUT, e.g. with 3-level nodes at 0%, 50%, 100% of c/m/y/k ($3^4$=81 entries), using measurement of 81 colors at the nodes, and then interpolate NMF values at finer-resolution nodes, e.g. $5^4$=625 entries, for building the NMF database. It would be expected that the accuracy from such low-resolution LUT would be poor. This invention would then improve the accuracy by adding the error terms for the full set of nodes throughout the time axis to account for the changes due to printer drift.

Example Special Purpose Computer

Figure 11:
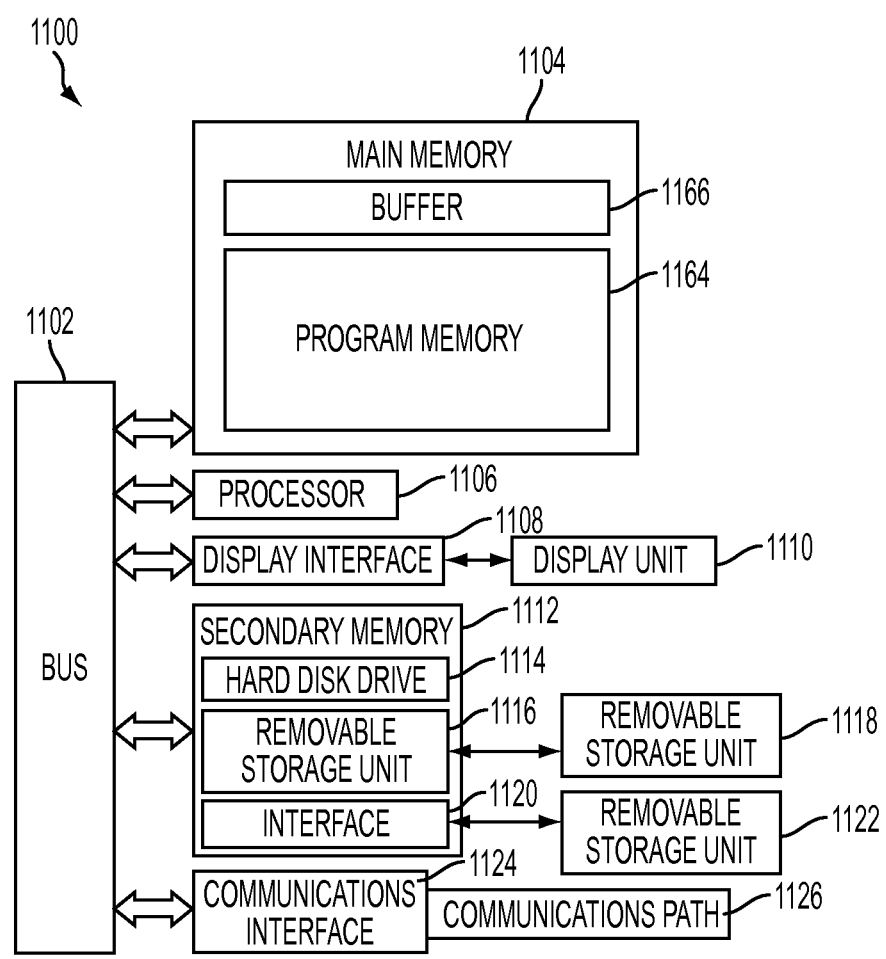
FIG. 11 illustrates a block diagram of one example embodiment of a special purpose computer useful for implementing one or more aspects of the present method, as shown and discussed with respect to the above-described illustrations.

Referring to FIG. 11, shown is a functional block diagram of one example special purpose computer useful for implementing one or more aspects of the present invention. A plurality of modules may be executed by either a single special purpose computer system or a plurality of special purpose computer systems in parallel. Connections between modules include both physical and logical connections. Modules may further include one or more software/hardware modules which may further comprise an operating system, drivers, device controllers, and other apparatuses some or all of which may be connected via a network. The special purpose computer of FIG. 11 could be implemented as a separate computer system, an electronic circuit, or an ASIC, for example. The nature of the implementation will depend on the processing environment wherein the present method finds its intended uses.

Special purpose computer system 1100 includes processor 1106 for executing machine executable program instructions for carrying out all or some of the present method. The processor is in communication with bus 1102. The system includes main memory 1104 for storing machine readable instructions. Main memory may comprise random access memory (RAM) to support reprogramming and flexible data storage. Buffer 1166 stores data addressable by the processor. Program memory 1164 stores machine readable instructions for performing the present method. A display interface 1108 forwards data from bus 1102 to display 1110. Secondary memory 1112 includes a hard disk 1114 and storage device 1116 capable of reading/writing to removable storage unit 1118, such as a floppy disk, magnetic tape, optical disk, etc. Secondary memory 1112 may further include other mechanisms for allowing programs and/or machine executable instructions to be loaded onto the processor. Such mechanisms may include, for example, a storage unit 1122 adapted to exchange data through interface 1120 which enables the transfer of software and data. The system includes a communications interface 1124 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 1126 which carries such signals and may be implemented using wire, cable, fiber optic, phone line, cellular link, RF, memory, or other means known in the arts.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for carrying instructions and/or data to the computer system or device. Such computer program products may include non-volatile memory, such as a floppy disk, hard drive, memory, ROM, RAM, flash memory, disk memory, and other storage useful for transporting machine readable program instructions for executing the present method. It may further include a CD-ROM, DVD, tape, cassette, or other digital or analog media, capable of having embodied thereon one or more logical programming instructions or other machine executable codes or commands that implement and facilitate the function, capability, and methods disclosed herein.

It should be understood that one or more aspects of the present method are intended to be incorporated in an article of manufacture, including one or more computer program products. The article of manufacture may be included on a storage device readable by a machine architecture, xerographic system, color management or other image processing system, any of which capable of executing program instructions containing the present method. Such an article of manufacture may be shipped, sold, leased, or otherwise provided separately either alone or as part of an add-on, update, upgrade, download, or product suite by the assignee or a licensee hereof as part of a computer system, xerographic system, document processing system, image processing system, color management system, operating system, software program, plug-in, DLL, or a storage device.

It will be appreciated that the above-disclosed features and function and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for updating an image quality metric database, the method comprising:
    performing at a first time:
        measuring a defined image quality metric for a set of device-dependent colorant specifications;
        storing said measured image quality metric to a database;
        deriving a first model based upon said measurements obtained for the defined image quality metric, corresponding to a subset of said device-dependent colorant specifications;
        using the first model to obtain first model-predicted values for the defined image quality metric at the set of device-dependent colorant specifications;
        determining an error term at each of said set of device-dependent colorant specifications for said defined image quality metric, said error term being a difference between said measured image quality metric and said first model-predicted values; and
        storing said set of error terms to said database; and
    performing at a second time:
        measuring said defined image quality metric for said subset of device-dependent colorant specifications;
        deriving a second model based upon these measurements performed at said second time;
        using said second model to obtain second model-predicted values for said defined image quality metric;
        adding said set of error terms to said second model-predicted values to produce modified model-predicted values; and
        updating said database with said modified model-predicted values.

2. The method of claim 1, wherein the defined image quality metric comprises at least one of: graininess, mottle, banding, temporal color variation, and streaking.

3. The method of claim 1, wherein the model comprises a polynomial model.

4. The method of claim 1, wherein the model comprises a low-resolution lookup table.

5. The method of claim 1, wherein the model comprises a variance model.

6. The method of claim 1, wherein the subset of the device-dependent colorant specifications comprises device-dependent single-separation colorants using a target marking device.

7. The method of claim 1, wherein the subset of the device-dependent colorant specifications comprises preselected combinations of device-dependent colorants using a target marking device.

8. The method of claim 1, further comprising using the model-predicted values stored in the database to dynamically compensate for an image quality defect in a target marking device.

9. The method of claim 1, further comprising using the model-predicted values stored in the database to dynamically generate smoothness-optimized spot color recipes in an image processing system.

10. A system for updating an image quality metric database, said system comprising:
- a memory;
- a storage medium for storing data; and
- a processor in communication with said storage medium and said memory, said processor executing machine readable instructions for performing the method of:
- performing at a first time:
- measuring a defined image quality metric for a set of device-dependent colorant specifications;
- storing said measured image quality metric to a database;
- deriving a first model based upon said measurements obtained for the defined image quality metric, corresponding to a subset of said device-dependent colorant specifications;
- using the first model to obtain first model-predicted values for the defined image quality metric at the set of device-dependent colorant specifications;
- determining an error term at each of said set of device-dependent colorant specifications for said defined image quality metric, said error term being a difference between said measured image quality metric and said first model-predicted values; and
- storing said set of error terms to said database; and
- performing at a second time:
- measuring said defined image quality metric for said subset of device-dependent colorant specifications;
- deriving a second model based upon these measurements performed at said second time;
- using said second model to obtain second model-predicted values for said defined image quality metric;
- adding said set of error terms to said second model-predicted values to produce modified model-predicted values; and
- updating said database with said modified model-predicted values.

11. The system of claim 10, wherein the defined image quality metric comprises at least one of: graininess, mottle, banding, temporal color variation, and streaking.

12. The system of claim 10, wherein the model comprises a polynomial model.

13. The system of claim 10, wherein the model comprises a low-resolution lookup table.

14. The system of claim 10, wherein the model comprises a variance model.

15. The system of claim 10, wherein the subset of the device-dependent colorant specifications comprises device-dependent single-separation colorants using a target marking device.

16. The system of claim 10, wherein the subset of the device-dependent colorant specifications comprises preselected combinations of device-dependent colorants using a target marking device.

17. The system of claim 10, further comprising using the model-predicted values stored in the database to dynamically compensate for an image quality defect in a target marking device.

18. The system of claim 10, further comprising using the model-predicted values stored in the database to dynamically generate smoothness-optimized spot color recipes in an image processing system.

19. A method for updating an image quality metric database, the method comprising:
- for at least two time periods performing the following:
- measuring a defined image quality metric for a set of device-dependent colorant specifications;
- storing said measured image quality metric to a database;
- deriving a first variance model based upon said measurements obtained for said defined image quality metric, corresponding to a subset of said device-dependent colorant specifications, wherein said first model comprises a variance model;
- using said first model to obtain first model-predicted values for said defined image quality metric at said set of device-dependent colorant specifications;
- determining an error term at each of said set of device-dependent colorant specifications for said defined image quality metric, said error term being a difference between said measured image quality metric and said first model-predicted values; and
- storing said set of error terms to said database; and
- performing at a second time:
- measuring said defined image quality metric for said subset of device-dependent colorant specifications;
- deriving a second model based upon these measurements performed at said second time, wherein said second model comprises a variance model;
- using said second model to obtain second model-predicted values for said defined image quality metric at said set of device-dependent colorant specifications;
- adding said set of error terms to said second model-predicted values to produce modified model-predicted values; and
- updating said database with said modified model-predicted values.

20. The method of claim 19, wherein the defined image quality metric comprises at least one of: graininess, mottle, banding, temporal color variation, and streaking.

21. The method of claim 19 wherein the subset of the device-dependent colorant specifications comprises device-dependent single-separation colorants using a target marking device.

22. The method of claim 19 wherein the subset of the device-dependent colorant specifications comprises preselected combinations of device-dependent colorants using a target marking device.

23. The method of claim 19, further comprising using the model-predicted values stored in the database to dynamically compensate for an image quality defect in a target marking device.

24. The method of claim 19, further comprising using the model-predicted values stored in the database to dynamically generate smoothness-optimized spot color recipes in an image processing system.

* * * * *